United States Patent Office 3,407,207
Patented Oct. 22, 1968

---

3,407,207
PROCESS FOR OBTAINING AMINO DERIVATIVES
Paolo Longi, Riccardo Montagna, and Romano Mazzocchi, Milan, Italy, assignors to Montecatini Edison S.p.A., Milan, Italy, a corporation of Italy
No Drawing. Filed Feb. 14, 1966, Ser. No. 527,071
Claims priority, application Italy, Feb. 15, 1965, 3,018/65
4 Claims. (Cl. 260—315)

ABSTRACT OF THE DISCLOSURE

Lithium or sodium diphenyl amide, or potassium-N-carbazole, is reacted with sulphur, in a suitable solvent, to obtain amino derivatives useful as antioxidants and stabilizers in the plastics field, or as accelerators or vulcanizers for rubbers.

---

The present invention refers to a synthesis process for obtaining amino derivatives with the use of alkali metal alkyl amides and alkali metal aryl amides.

The behavior of the amides of alkali metals, particularly of sodium amide, with organic and inorganic compounds has amply been studied and described. See for instance:

R. Levine, W. C. Fernelius, Chem. Rev. 54, 449–573 (1954);
F. W. Bergstrom, W. C. Fernelius, Chem. Rev. 12, 43–179 (1933);
F. W. Bergstrom, W. C. Fernelius, Chem. Rev. 20, 413–481 (1937).

However, all that is known in the literature essentially regards the nonsubstituted amides of the alkaline metals corresponding to the general formula: $MeNH_2$, where Me is an alkali metal such as lithium, sodium and potassium. Reactions between organic and inorganic compounds with metal amides of the $MeNR_2$ type, where Me is an alkali metal and R an alkyl or aryl group, have been studied little.

DESCRIPTION OF THE PRESENT INVENTION

Applicants have now surprisingly found that by reacting a compound of MNRR' type (wherein M is Na, K or Li, R and R' are equal to each other or different from each other and are hydrocarbyl groups having 1 to 14 carbon atoms, or form with nitrogen a heterocyclic ring) with chlorine, sulphur or chloroform, amino derivatives of the type $[(RR'N)_n(X)_m]_p$, where R and R' have the above-meaning, X represents S,

or Cl, m is equal to 1 or 2, n is equal to 1, 2 or 3 and p is a whole number from 1 to 100 and represents the number of recurring units, can be obtained.

The lithium amides, LiNRR', used in these reactions, have been prepared by reaction of lithium n-butyl with the corresponding secondary amines HNRR' or by employing the processes disclosed by K. Zeigler in French Patent 774,316, Dec. 5, 1934, and German Patent 615,-468, June 6, 1935. The above methods can also serve for preparation of sodium and potassium dialkyl amides.

Sodium and potassium amides have been prepared, in the best way, by reacting sodium hydride and respectively, metallic potassium with secondary aromatic amines, in tetrahydrofurane as the reaction medium.

All the reactions between metal amides and organic and inorganic compounds have been carried out under inert gas atmosphere (e.g., nitrogen or argon) in the absence of moisture and at temperatures between 0° C. and 150° C.

Said reactions are preferably carried out by slowly adding a suspension or solution of the organic or inorganic compound in a suitable solvent, to a stirred suspension or solution of metal amide. Aliphatic hydrocarbons such as n-heptane, aromatic hydrocarbons such as benzol, cycloaliphatic hydrocarbons such as cyclohexane or ethers such as tetrahydrofuran or ethyl ether, all previously anhydrated and preserved in a nitrogen atomsphere, can be used as solvents or reaction medium.

Some typical reactions of alkali metals with some organic and inorganic compounds are hereinafter described.

In some cases, such as in the reaction between lithium diphenyl amide and chloroform or sulphur, up to now unknown substances have been obtained. Some of them can have interesting applications: N,N',N''-tris(diphenylamino)methane for instance, can be used as a pesticide, fungicide and deherbants. N,N' - bis(diphenylamino)sulphide and other analogous compounds such as N,N'-dicarbazylsulphide or N,N'-bis(di-beta-naphthylamine)sulphide may be used in the field of antioxidants and stabilizers for plastic materials.

The corresponding disulphides and polyaminosulphides, such as those obtained in Example 6, can be used as accelerators and vulcanizers for natural and synthetic rubber.

Example 1

Into a 100 cm.³ capacity three-necked vessel equipped with a stirrer and a reflux cooler, there are introduced, under nitrogen atmosphere, 2 g. of lithium dimethylamine, $LiN(CH_3)_2$, (0.039 mol), 30 cm.³ of anhydrous benzene and, at a temperature of 5° C., 1.3 g. of sulphur powder (0.040 g.-atom). After 2 hours, while stirring, benzene is allowed to boil and kept at this temperature for 2 hours. The solid phase is then removed by filtration and the benzene phase is evaporated.

1.7 g. of colorless, oily liquid are obtained, which when compared by gas-chromatography with two authentic samples of $(CH_3)_2N$—S—$N(CH_3)_2$ and

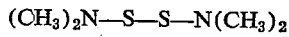

(obtained according to Blake, J. Am. Chem. Soc. 65, 1267 (1943)), are shown to consist of about 60% of $(CH_2)_2N$—S—$N(CH_3)_2$ and 40% of

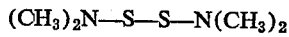

Example 2

Example 1 is repeated, but in this case 4.0 g. of lithium diphenyl amide, $LiN(C_6H_5)_2$, (0.023 mol) in 60 cm.³ of benzol and 0.77 g. of sulphur powder (0.024 mol) are employed. After filtration, the solution is evaporated and the solid residue extracted with boiling heptane. From heptane solution an oily yellowish-green product is separated by cooling. By evaporation of the remaining cold solution, a product having a melting point of 159–160° C. crystallizes in colorless needles. The cryoscopic molecular weight, in benzene solution, is 357. The elementary analysis gives: C=78.21%; H=5.53%; N=7.51%; S=8.62%. The calculated values for

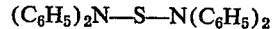

are: C=78.22%; H=5.47%; N=7.60%; S=8.71%; molecular weight 368.49.

The new compound is N,N''-bis(diphenylamino)sulphide. It is soluble in any organic solvent.

Example 3

In a 3 liter three-necked vessel equipped with a stirrer and dropping funnel, a suspension of 54.1 g. of lithium diphenyl amide, $LiN(C_6H_5)_2$, (0.32 mol) (prepared by reacting 65 g. of diphenyl amide in 1500 cm.³ of n-heptane and a solution of 24 g. of lithium n-butyl in 800 cm.³ of n-heptane) in 2300 cm.³ of n-heptane is prepared. While stirring at 20° C., a solution of 11.4 g. of chloroform (0.095 mol) in 50 cm.³ of heptane is added. Then the whole is heated at boiling temperature for 3 hours. Finally, the reaction product is treated with water and benzene is added until a clear solution is obtained. The organic phase is separated and evaporated. The residue is then dissolved in about 200 cm.³ benzene and about 100 cm.³ heptane are added. A grey flocky product (2.8 g.) precipitates, whose isopiestic molecular weight in chloroform is 1600. On the basis of I.R. spectrum examination, it is apparently a polymeric substance containing phenylamine groups. From the mother liquor, a crystalline product is separated by gentle evaporation. It amounts to 4.5 g. After two crystallizations (by gentle evaporation) a colorless crystalline product is obtained which melts (closed capillary, under nitrogen atmosphere) at 260–261° C.

It is soluble in benzene, chloroform and methylene chloride; it is insoluble in aliphatic hydrocarbons, methanol, acetone and ethyl ether. It is unstable in the presence of oxygen at temperatures higher than 150° C. The isopiestic molecular weight in chloroform solution is 513. The elementary analysis gives: C=85.50%; H=6.08%; N=8.10%. Examination of the I.R. absorption spectrum (in hexachlorobutadiene solution) shows the presence of a weak band at 3.41μ, due to non-aromatic CH group.

From these results it can be inferred that the new compound is tris(N,N-diphenyl)aminomethane, $$HC[N(C_6H_5)_2]_3$$

The calculated values for this compound: C=85.84%; H=6.04%; N=8.12%; molecular weight; 517.64.

Example 4

Into a 70 cm.³ capacity three-necked tube, provided with a stirrer, a suspension of 1.18 g. of lithium dimethyl amide, LiN(CH₃)₂, (0.023 mol) in 10 cm.³ of n-heptane, is introduced under nitrogen atmosphere. One of the necks is connected with a graduated burette containing chlorine (concentrated sulphuric acid as filler liquid). Chlorine gas is contacted with the stirred lithium amide suspension at a temperature of 0° C. Totally, 550 N cm.³ of chlorine, corresponding to 0.024 mol, are reacted. The reaction product is treated with water and the benzene phase is separated. By means of gas-chromatographic examination and by comparison with an authentic sample of N,N'-dimethylchloroamine (obtained according to G. H. Coleman, J. Am. Chem. Soc. 55, 3003 (1933)), this phase shows the presence of dimethylchloroamine. By fractionated distillation, a fraction, about 1 cm.³ is isolated, having a boiling point equal to 45–47° C./760 mm. Hg. In the literature N,N'-dimethylchloroamine has a boiling point equal to 46° C./765 mm. Hg. The N,N'-dimethylchloroamine, therefore, was formed according to the reaction.

$$LiN(CH_3)_2 + Cl_2 \rightarrow LiCl + (CH_3)_2NCl$$

Example 5

Into a 2 liter three-necked vessel provided with a stirrer, dropping funnel and reflux cooler, 30 g. of sodium hydride and 500 cm.³ of anhydrous tetrahydrofurane are introduced under a nitrogen atmosphere. After heating at boiling temperature, a solution containing 169 g. of diphenylamine in 500 cm.³ of anhydrous tetrahydrofurane is slowly added. Heating is continued until hydrogen is no longer evolved. The resulting solution is then filtered, under nitrogen atmosphere, on a 2 g. porous filter (average diameter of the pores=40–80μ). The clear yellow solution is evaporated and the solid residue dried at 150–160° C. at 0.3 mm. Hg.

The white powder thus obtained and 1000 cm.³ of anhydrous benzene are put in a three-necked vessel having a capacity of 2 liters and 40 g. of sulphur powder are added. The whole is heated, while stirring, at the boiling point for 6 hours and then filtered under nitrogen atmosphere. From the clear solution, benzene is removed by evaporation and the residue dissolved with hot n-heptane. By cooling and partial evaporation of heptane, colorless needles having a melting point equal to 161° C. are obtained. Elementary analysis shows that this substance is identical to the product obtained by reaction of lithium diphenyl amide with sulphur in Example 2.

Example 6

Into a 500 cm.³ three-necked vessel provided with a stirrer, dropping funnel and reflux cooler, a solution containing 19.1 g. of sodium diphenyl amide (prepared as described in the preceding example) in 150 cm.³ of tetrahydrofurane is introduced, under nitrogen atmosphere. While stirring, 7 g. of sulphur powder are added and, after about half an hour, the vessel is heated to the solvent boiling temperature. After 4 hours all the tetrahydrofurane is evaporated and the solid residue is extracted with boiling benzene for a few hours, in a dry nitrogen atmosphere. The benzene extract, concentrated to a small volume, is poured into 400 cm.³ of a 1:1 ethyl ether/n-heptane mixture. A light yellow precipitate is separated, which is filtered and dried. It amounts to 6.4 g. and has a molecular weight, as determined by the isopiestic method in chloroform solution, of about 10,000. The substance is soluble in benzene, chloroform, methylene chloride, tetrahydrofurane and acetone. It is insoluble in aliphatic hydrocarbons, ethanol and ethyl ether. Its softening temperature is about 150° C.

From the filtered liquid, after removal by evaporation of most of the ethyl ether, another substance is separated (0.6 g.) having a structure similar to the first one, having a molecular weight of about 3000 and a softening temperature of about 100° C.

The elementary analysis of the polymer having a molecular weight equal to 10,000 gives the following result: C=71.51%; H=4.95%; N=6.84%; S=16.60%. Calculated for [(C₆H₅)₂NS]ₚ: C=71.97%; H=5.03%;

N=6.99%; S=16.01%

Therefore, it can be concluded that the polymer macromolecules essentially have the following structure:

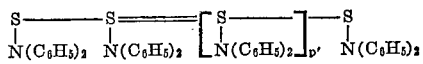

wherein p' is a positive integer. It is seen that p' in this formula differs from p in the general formula by the 3 end units shown. Satisfactory products are obtained when p' is from 1 to 97.

Example 7

Into a three-necked vessel having a capacity of 1.5 liters, provided with a stirrer, dropping funnel and reflux cooler, 23 g. of metallic potassium and 300 cm.³ of anhydrous tetrahydrofurane are introduced under a nitrogen atmosphere. After heating and stirring, so as to powder the potassium, a solution contaning 83.5 g. of carbazol in 800 cm.³ of tetrahydrofurane is slowly added. Formation of potassium N-carbazyl is accompanied by a slight evolution of gas. The clear yellow solution is filtered and all the tetrahydrofurane removed by evaporation. The solid residue is dried at 120–130° C. at 0.1 mm. Hg. The yellow powder thus obtained is suspended in 500 cm.³ of toluene, 16 g. of sulphur prowder are added and the whole is heated at 70° C. for 4 hours. Toluene is then removed by evaporation and the solid product obtained is extracted with boiling benzene for 20–30 hours. By evaporation of benzene a white substance is obtained, which amounts to 535 g. In order to further purify it, it is washed with hot ethanol and then twice crystallized from dioxane.

Colorless needles are obtained, which by rapid heating under a nitrogen atmosphere melt at 230±1° C. The product is soluble in dioxane, tetrahydrofurane, chloroform, methylene chloride and benzol.

The elementary analysis gives: C=79.10%; H=4.49%; N=7.82%; S=8.78%. The calculated values for N,N"-dicarbazylsulphide, $C_{24}H_{16}N_2S$ are C=79.07%;

H=4.43%; N=7.69%; S=8.81%

The new comopund, therefore, is N,N'-dicarbazylsulphide.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. The polyaminosulphide having the structure

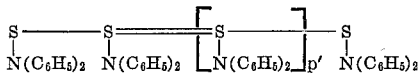

wherein $p'$ is a positive integer, having a value of from 1 to 97.

2. The process for producing a polyaminosulphide of the structure set forth in claim 1, which comprises mixing powdered sulphur with a solution of sodium diphenyl amide in tetrahydrofuran under an inert atmosphere and in the substantial absence of moisture, heating the mass at the boiling point of the solvent until substantially all of the solvent is evaporated, and thereafter recovering the polyaminosulphide from the reaction product.

3. The process for producing N,N"-bis(diphenylamino)sulphide, which comprises mixing powdered sulphur with a solution of lithium diphenyl amide in benzol, at a temperature of about 5° C., in the substantial absence of moisture and under an inert atmosphere, allowing the benzol to boil, maintaining the mass at the boiling point of the benzol for about two hours, and thereafter recovering the N,N'-bis(diphenylamino)sulphide which is formed, from the reaction product.

4. The process for producing N,N-dicarbazylsulphide which comprises mixing powdered metallic potassium with carbazol, in tetrahydrofurane under heating to form potassium N-carbazyl, filtering the resulting solution, evaporating the tetrahydrofuran, suspending the solid residue of the evaporation step in toluene, mixing powdered sulphur with the suspension, heating the mixture at about 70° C. for about 4 hours, and thereafter recovering the N,N-dicarbazylsulphide which is formed, from the reaction product.

References Cited

UNITED STATES PATENTS 2,850,496    9/1958    Hardman      260—247.1
3,214,471    10/1965    Clemens      260—570.5

FOREIGN PATENTS 1,343,451    10/1963    France.

OTHER REFERENCES

Blake: J.A.C.S., 65, 1267 (1943).

I. G. Farbenindustrie Akt.-Ges., Chem. Zentralblatt, Jahr 99, Band II, pp. 496–7 (1928).

Ingram: Chem. Zentralblatt, Jahr 104, Band I, p. 3251 (1933).

Sibata et al.: Chem. Zentralblatt, Jahr 104, Band I, pp. 2442–3 (1936).

HENRY R. JILES, *Primary Examiner.*

C. M. SHURKO, *Assistant Examiner.*